United States Patent
Kurihara et al.

(10) Patent No.: US 6,442,108 B1
(45) Date of Patent: Aug. 27, 2002

(54) INFORMATION RECORDING/REPRODUCING APPARATUS

(75) Inventors: Tetsuo Kurihara; Kazuo Kobayashi, both of Chofu (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/525,647

(22) Filed: Mar. 15, 2000

(30) Foreign Application Priority Data

Mar. 25, 1999 (JP) .......................... 11-081773

(51) Int. Cl.⁷ .................................. G11B 7/00
(52) U.S. Cl. ................... 369/30.05; 369/30.07; 369/30.09
(58) Field of Search .................. 369/30.05, 30.07, 369/30.09, 84

(56) References Cited

U.S. PATENT DOCUMENTS 6,243,328 B1 * 6/2000 Fenner et al. .................. 369/30

* cited by examiner

*Primary Examiner*—Nabil Hindi
(74) *Attorney, Agent, or Firm*—Ladas & Parry

(57) ABSTRACT

An information recording and/or reproducing apparatus that records desired information from a plurality of kinds of information having identification information attached thereto, the apparatus having identification information detecting means for detecting the identification information from information supplied thereto; first recording means for sequentially recording supplied information and for recording a table of contents (TOC) of the supplied information including the identification information detected by the identification information detecting means; specifying means for specifying desired information from the TOC recorded by the first recording means; and controlling means for reading the desired information specified by the specifying means from the first recording means.

7 Claims, 7 Drawing Sheets

| D1 | D2 |
|---|---|
| SONG TITLE | AUDIO DATA |

TB

| SELECTION NO. (S1) | SONG TITLE (S2) | START ADDRESS (S3) |
|---|---|---|
| 1 | NM1 | A1 |
| 2 | NM2 | A2 |
| ⋮ | ⋮ | |
| n | NMn | An |
| | | An+1 |

INFORMATION RECORDING/REPRODUCING APPARATUS

BACKGROUND OF THE INVENTION

1. Field of the Invention

The present invention relates generally to an information recording and/or reproducing apparatus (hereinafter an information recording/reproducing apparatus), and more particularly, to an information recording/reproducing apparatus that records desired information from a plurality of kinds of information having identifying information attached thereto, such as digital audio broadcasts.

2. Description of the Related Art

In recent years, digital satellite broadcasting, or DSB, has become available on a pay-per-view basis. In response to consumer demand DSB is provided with a large number of channels such as, for example, movie channels and music channels.

Typically, such channels are scrambled for transmission. Subscribers are provided with a receiver. After selecting the requisite channel and paying a fee, the relevant channel is descrambled for subscriber viewing.

By contrast, the DSB music channels broadcast a large number of songs in a predetermined sequence. As a result, even when able to receive DSB transmissions subscribers are still unable to listen to selections they like when they like. In order to do so, subscribers currently use a recording apparatus, hereinafter referred to as a recorder, to record only those selections they like on a recording medium for later reproduction.

FIG. 1 is a block diagram of an example of the conventional art. As shown in the diagram, the DSB transmission is received by an antenna 1. The antenna 1 is connected to a tuner 2 and the DSB transmission received by the antenna 1 is supplied to the tuner.

The tuner 2 selects the required channel from the DSB transmission supplied from the antenna 1. The signal of the channel selected by the tuner 2 is then supplied to a decoder 3. The decoder 3 descrambles the signal of the selected channel and converts the descrambled signal to an audio signal, which the decoder 3 then supplies to an amplifier 5.

The amplifier 5 then amplifies the audio signal supplied from the decoder 3, activates a speaker 6 and reproduces the audio. Additionally, the audio signal descrambled by the decoder 3 is supplied to the recorder 7 and recorded to a recording medium as necessary.

However, a problem arises in that recording only the required information from the DSB transmission requires that the listener monitor the DSB transmission and wait until the desired song is broadcast. Additionally, even when the desired song is broadcast the listener must then perform certain operations with the recorder, which means that operator error can result in the required information not being recorded.

SUMMARY OF THE INVENTION

Accordingly, it is a general object of the present invention to provide an improved and useful information recording and/or reproducing apparatus, in which the disadvantages described above are eliminated.

The above-described object of the present invention is achieved by an information recording and/or reproducing apparatus that records desired information from a plurality of kinds of information having identification information attached thereto, the apparatus comprising:

identification information detecting means for detecting the identification information from information supplied thereto;

first recording means for sequentially recording supplied information and for recording a table of contents (TOC) of the supplied information including the identification information detected by the identification information detecting means;

specifying means for specifying desired information from the TOC recorded by the first recording means; and controlling means for reading the desired information specified by the specifying means from the first recording means.

Additionally, the above-described object of the present invention is also achieved by the information recording and/or reproducing apparatus as described above, further comprising second recording means for recording the information read from the first recording means by the controlling means.

Additionally, the above-described object of the present invention is also achieved by the information recording/reproducing apparatus as described above, wherein the storage capacity of the first recording means is greater than the storage capacity of the second recording means.

Additionally, the above-described object of the present invention is also achieved by the information recording/reproducing apparatus as described above, further comprising information expanding means for expanding information read from the second recording means.

Additionally, the above-described object of the present invention is also achieved by the information recording apparatus as described above, wherein the first recording means includes a digital magnetic recording/reproducing apparatus.

Additionally, the above-described object of the present invention is also achieved by the information recording apparatus as described above, wherein the second recording means includes an optical disk recording/reproducing apparatus.

Additionally, the above-described object of the present invention is also achieved by the information recording/reproducing apparatus as described above, wherein the information is audio data, and the identifying information includes a title of the audio data.

According to the invention described above, it is possible to select only desired information from the information recorded sequentially by the first recording means and to record only the required information in the second recording means.

Other objects, features and advantages of the present invention will become more apparent from the following detailed description when read in conjunction with the accompanying drawings.

DESCRIPTION OF THE PREFERRED EMBODIMENTS

A description will now be given of an information recording/reproducing apparatus according to an embodiment of the present invention, with reference to the accompanying drawings.

Figure 1:
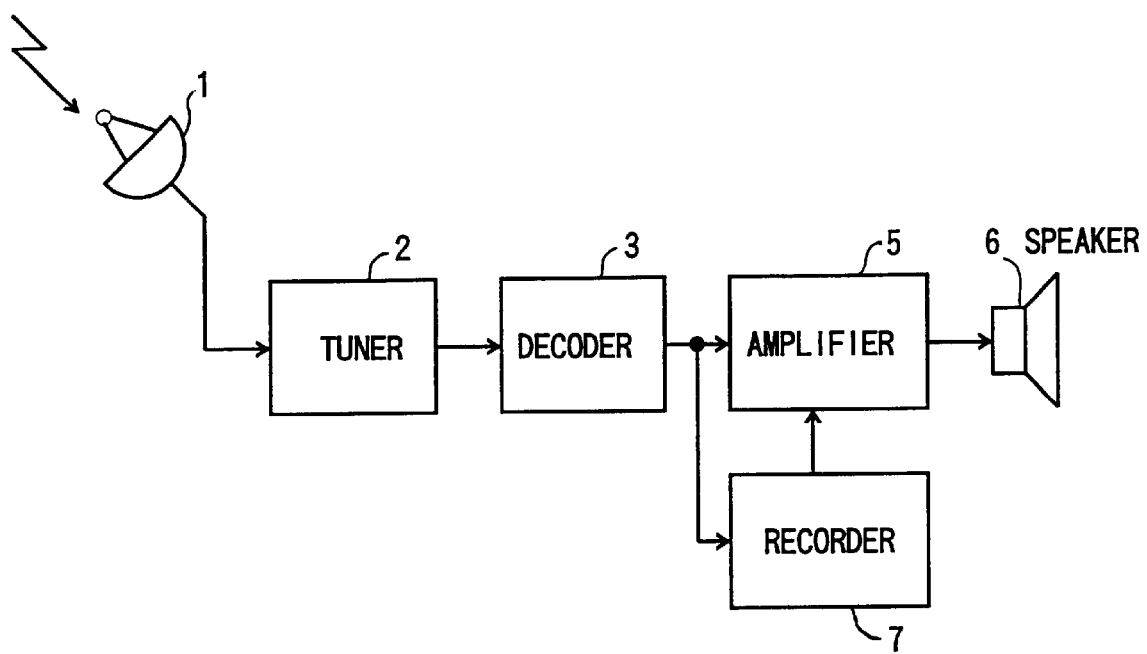
FIG. 1 is a block diagram of an example of the conventional art.
Figure 2:
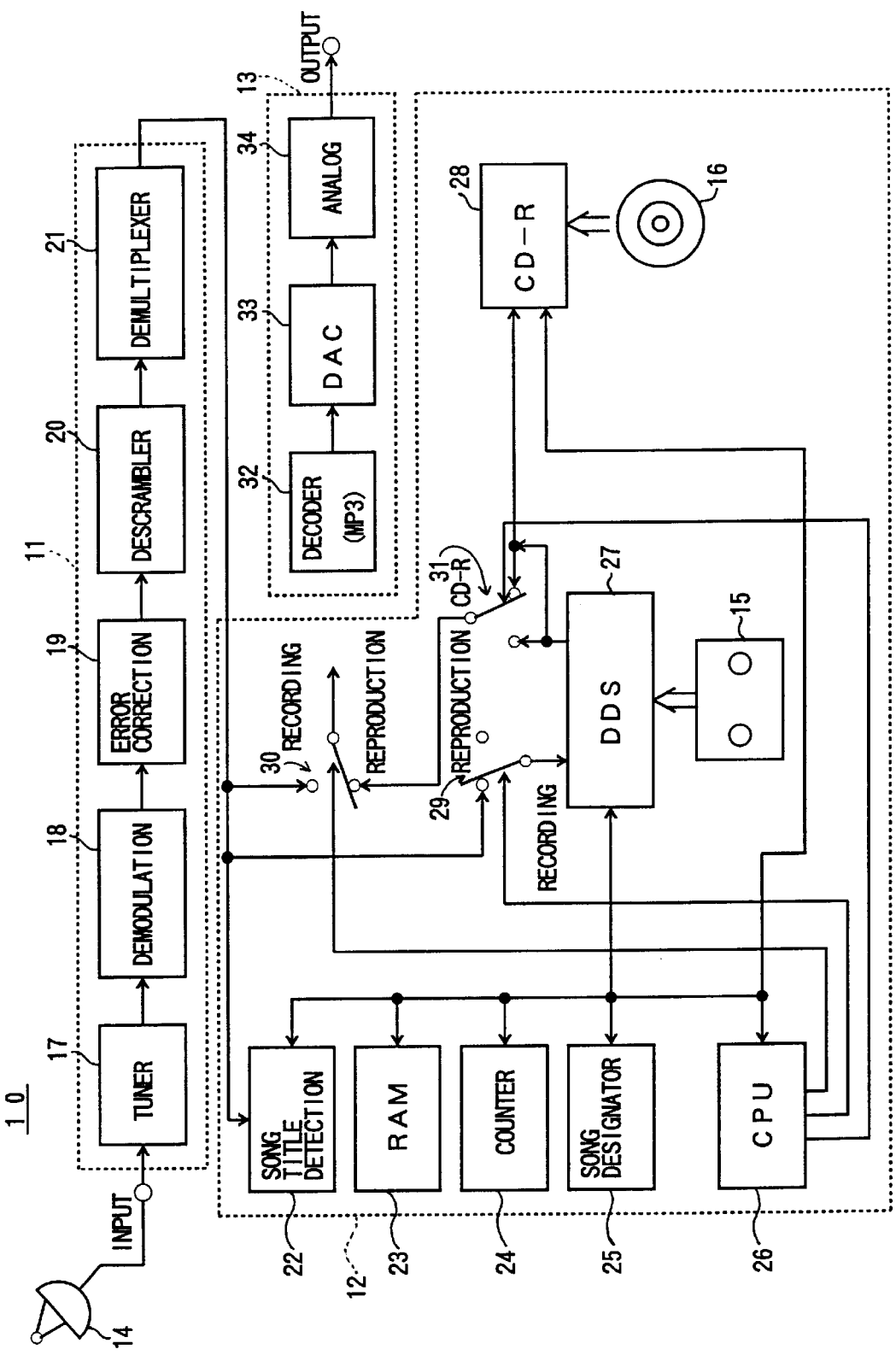
FIG. 2 is a block diagram for an information recording/reproducing apparatus according to an embodiment of the present invention.

FIG. 2 is a block diagram for the information recording/reproducing apparatus according to an embodiment of the present invention. It should be noted that the present embodiment is described with reference to an information recording/reproducing apparatus for recording and reproducing DSB music channels.

The information recording/reproducing apparatus comprises a DSB transceiver unit 11, an information recording/reproduction unit 12 and an output unit 13.

The DSB transceiver unit 11 selects the desired channel information from the DSB transmission and outputs it. The information so selected and output by the DSB transceiver is supplied to an output unit 13 via the information recording/reproduction unit 12. The information recording/reproduction unit 12 stores the information selected and output by the DSB transceiver unit 11 on a DAT tape cassette 15, and at the same time stores the information stored on the DAT tape cassette 15 on a Compact Disk-Recordable, or CD-R disk 16. Additionally, the information recording/reproduction unit 12 supplies either an output signal of the DSB transceiver unit 11 or a reproduction signal from the information recording/reproduction unit 12 to the output unit 13.

The DSB transceiver unit 11 comprises a tuner 17, a demodulator 18, an error correction unit 19, a descrambler 20 and a demultiplexer 21.

The tuner 17 tunes the DSB transmissions received via the antenna 14. The signal of the DSB transmission selected by the tuner 17 is supplied to the demodulator 18.

The demodulator 18 demodulates the signal supplied from the tuner 17 into digital data. The digital data demodulated by the demodulator 18 is supplied to the error correction unit 19. The error correction unit 19 corrects errors present in the digital data supplied from the demodulator 18. The digital data corrected for errors by the error correction unit 19 is supplied to the descrambler 20.

The descrambler 20 descrambles the digital data from the scrambled state in which the digital data was transmitted. The descrambled digital data is then supplied to the demultiplexer 21.

The demultiplexer 21 extracts the selected channel data from the digital data descrambled by the descrambler 20. The output of the descrambler 21 is then supplied to the information recording/reproduction unit 12.

Figures 3, 4:
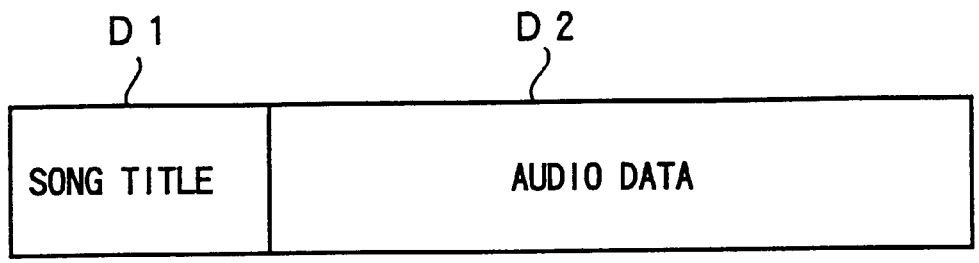
FIG. 3 shows a structure for a digital data of an information recording/reproducing apparatus according to an embodiment of the present invention.
FIG. 4 shows a data table structure for an information recording/reproducing apparatus according to an embodiment of the present invention.

FIG. 3 shows the structure of the digital data of the information recording/reproducing apparatus according to the present embodiment. As shown in the diagram, the digital data output from the DSB transceiver 11 comprises mainly a song title part D1 and a data part D2. Song titles D1 are set in the song title part D1 and audio data is set in the data part D2.

The information recording/reproduction unit 12 comprises a song title detector 22, a RAM 23, a counter 24, a song designator 25, a CPU 26, a Digital Data Storage (DDS) system 27, a CD-R system 28 and switches 29, 30, 31.

The song title detector 22 obtains the song title NMn by searching the song title part D1 of the digital data selected and output by the DSB transceiver 11 and having the structure indicated in FIG. 3. The RAM 23 creates a table TB for the purpose of enabling recognition of the songs stored in the DDS 27.

FIG. 4 shows a structure of the data table for the information recording/reproducing apparatus according to the present embodiment. As shown in the diagram, the table TB created by the RAM 23 comprises a song number region S1, a song title region S2 and a start address region S3.

A song title NM1 detected by the song title detector 22 is stored in the song title region S2. A song number n obtained by the counter 24 counting is stored in the song number region S1. A start address An for each song on the DAT tape 15 is stored in the start address region S3.

Additionally, the table TB stored in the RAM 23 is recorded at the start of the DAT tape 15 as the Table of Contents (TOC) after recording of information by the DDS 27 is completed.

The counter 24 counts up each time a song title is detected by the song title detector 22, generating song number information. The song designator 25 designates a desired song from the table set in the RAM 23. The CPU 26 controls the operation of the DDS 27 in a manner to be described below.

As a recording medium the DAT tape 15 is loaded in the DDS 27. The CPU directs the DDS 27 to record sequentially the digital data output from the DSB transceiver unit 11 on the DAT tape 15.

Figure 5:
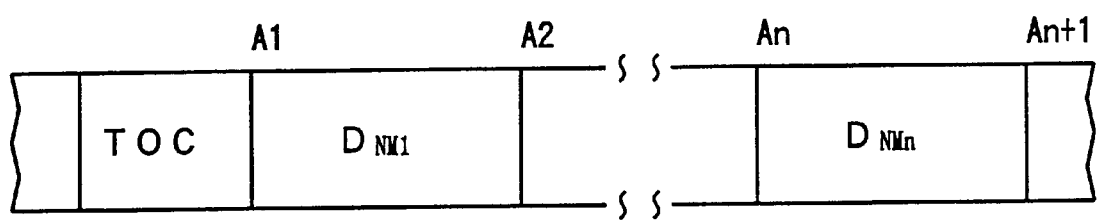
FIG. 5 shows a tape format for an information recording/reproducing apparatus according to an embodiment of the present invention.

FIG. 5 shows the tape format for the information recording/reproducing apparatus according to the present embodiment.

As shown in FIG. 5, the TOC is located at the start of the DAT tape 15. The information shown in FIG. 4 described above is stored in the TOC. The TOC is revised each time recording of information to the DAT tape 15 is completed. Following the TOC information, song information DNM1, DNM2 . . . DNMn is recorded sequentially on the DAT tape 15. The DDS 27 continuously records the DSB transmissions.

A CD-R disk 16 is loaded to the CD-R drive 28. From the recorded information the CD-R drive 28 records on the CD-R disk 16 information specified by the song designator 25.

Switch 29 connects the DSB transceiver 11 and the DDS 27 to each other during recording, supplies the signal from the DSB transceiver 11 to the DDS 27, and disconnects the DSB transceiver 11 and the DDS 27 from each other during reproduction. Switch 30 connects the DSB transceiver 11 and the output unit 13 to each other during recording, supplies the digital data received and demodulated by the DSB transceiver 11 to the output unit 13, and connects the output unit 13 to switch 31 during reproduction.

Switch 31 connects the CD-R drive 28 and the switch 30 to each other during recording/reproduction of information by the CD-R drive 28, and connects the DDS 27 and switch 30 to each other during reproduction of information recorded on the DAT tape 15 of the DDS 27.

Switches 29, 30, 31 are connected to the CPU 26 and are switched in response to control signals from the CPU 26. The CPU 26 operates the DDS 27 and the switches the switches 29, 30, 31 according to the operation of the song designator 25.

Additionally, the output unit 13 comprises a decoder 32, a digital-analog converter (DAC) 33, and an analog processing unit 34.

The decoder 32 performs expansion according to the compression used in DSB. The DAC 33 converts the music data expanded by the decoder 32 to an analog signal. The analog processing circuit 34 performs a desired analog processing of the analog signal converted by the DAC 33.

A description will now be given of an operation of the DDS 27 during recording of information.

Figure 6:
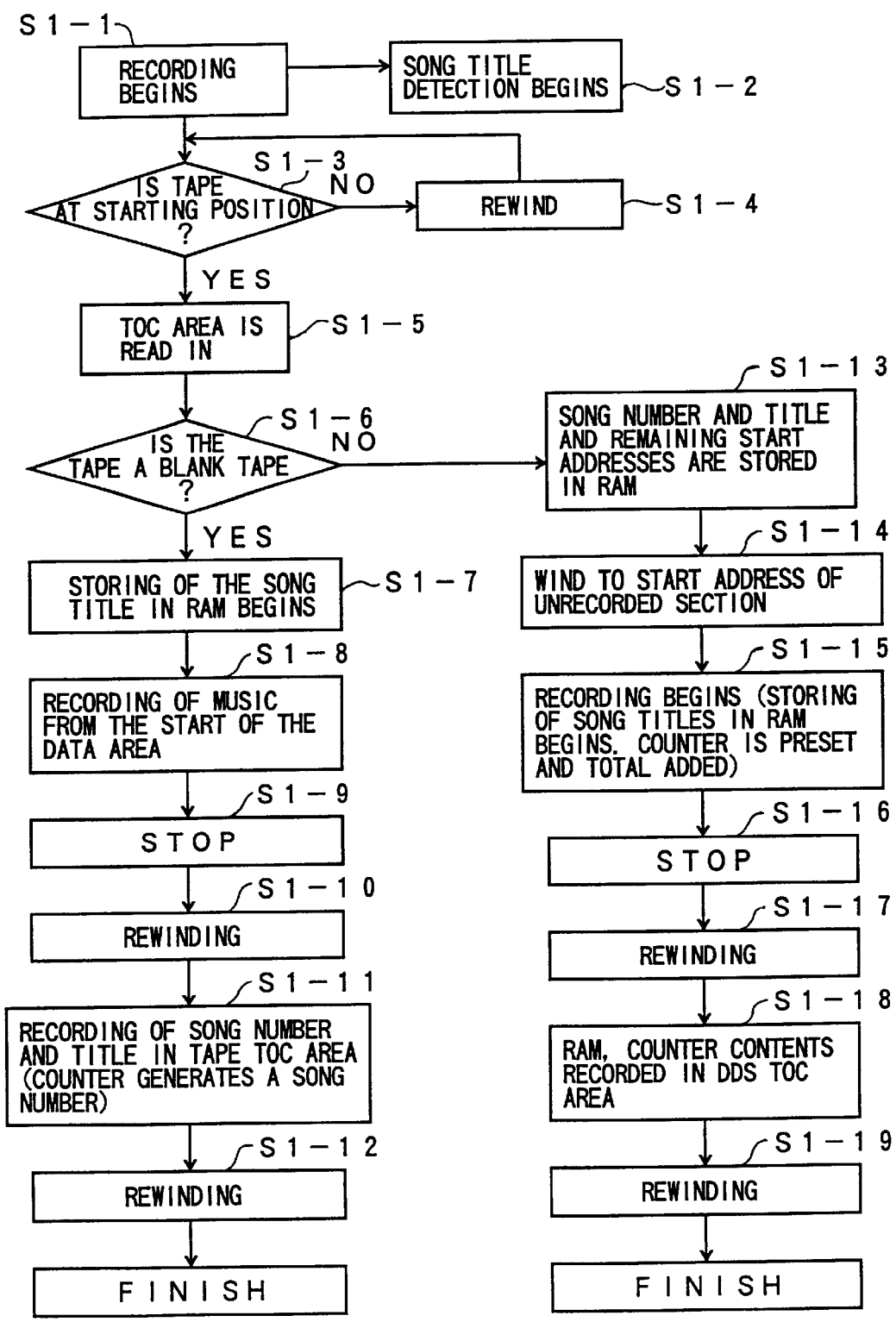
FIG. 6 is a flow chart of processes performed during recording by a CPU of an information recording/reproducing apparatus according to an embodiment of the present invention.

FIG. 6 is a flow chart of processes performed by a CPU of the information recording/reproducing apparatus according to the present embodiment during recording.

When a command has been issued by the song designator 25 to record song information on the DAT tape 15 using the DDS 27 in a step S1-1, the CPU 26 directs the song title detector 22 to detect the title of a song in a step S1-2 and at the same time also determines whether or not the DAT tape 15 loaded in the DDS 27 is at a starting position in a step S1-3.

If in step S1-3 it is determined that the DAT tape 15 is not at the starting position, then in a step S1-4 the DAT tape 15 is rewound to the starting position. Once the DAT tape 15 has been rewound to the starting position in step S1-4, then in a step S1-5 the TOC information recorded at the start of the DAT tape 15 is read out.

In a step S1-6 it is determined whether or not the DAT tape 15 loaded in the DDS 27 is a blank tape by reference to the TOC read out from the DAT tape 15 in step S1-5.

If it is determined in step S1-6 that the DAT tape 15 loaded in the DDS 27 is a blank tape, then in a step S1-7 the song title detected by the song title detector 22 in step S1-2 and the count counted by the counter 24 are recorded in the RAM 23 table TB shown in FIG. 4.

Next, in a step S1-8 the DDS 27 records music information sequentially from the start of the data area of the DAT tape 15 loaded in the DDS 27. It should be noted that the RAM 23 table TB changes each time the song changes and the title of the succeeding song is detected by the song title detector 22 in a step S1-8.

Next, when the recording of music information to the DAT tape 15 by the DDS 27 stops in a step S1-9, then in a step S1-10 the CPU 26 activates the DDS 27 and rewinds to the starting position the DAT tape 15 onto which music information has been recorded. When the DAT tape 15 has been rewound in step S1-10, the TOC recorded at the start of the tape is rewritten using the contents of the table TB recorded in the RAM 23 in a step S1-11.

When in step S1-11 the TOC located at the start of the DAT tape 15 is revised, the DAT tape 15 is once again rewound to the starting position in a step S1-12 and the process completed.

Additionally, if in step S1-6 it is determined that the DAT tape 15 loaded in the DDS 27 is not a blank tape, then the TOC recorded at the start of the DAT tape 15 is read out and recorded to the RAM 23 in a step S1-13.

Once the TOC of the DAT tape 15 loaded in the DDS 27 is read out to the RAM 23 table TB in step S1-13, the CPU 26 checks the RAM 23 table TB, acquires the last song information next address An+1, activates the DDS 27 and rewinds the DAT tape 15 to the acquired address An+1 in a step S1-14.

Next, the CPU 26 presets the counter 24 to the song number n of the last song of the RAM 23 table TB, activates the DDS 27 an records sequentially the music information received by the DSB transceiver 11 and, at the same time, revises the RAM 23 table TB contents sequentially with each song.

When in a step S1-16 the operation of recording music information to the DAT tape 15 using the DDS 27 is completed, in a step S1-17 the CPU 26 activates the DDS 27 and rewinds to a starting position the DAT tape 15 onto which the music information has been recorded. When the DAT tape 15 has been rewound in step S1-17, the TOC recorded at the start of the DAT tape 15 is rewritten using the contents of the table TB recorded in the RAM 23 in a step S1-18.

When in step S1-18 the TOC located at the start of the DAT tape 15 is revised, the DAT tape 15 is once again rewound to the starting position in a step S1-19.

As described above, music information received by the DSB transceiver 11 is sequentially recorded onto the DAT tape 15 loaded in the DDS 27 and the contents thereof recorded as the TOC at the start of the DAT tape.

Figure 7:
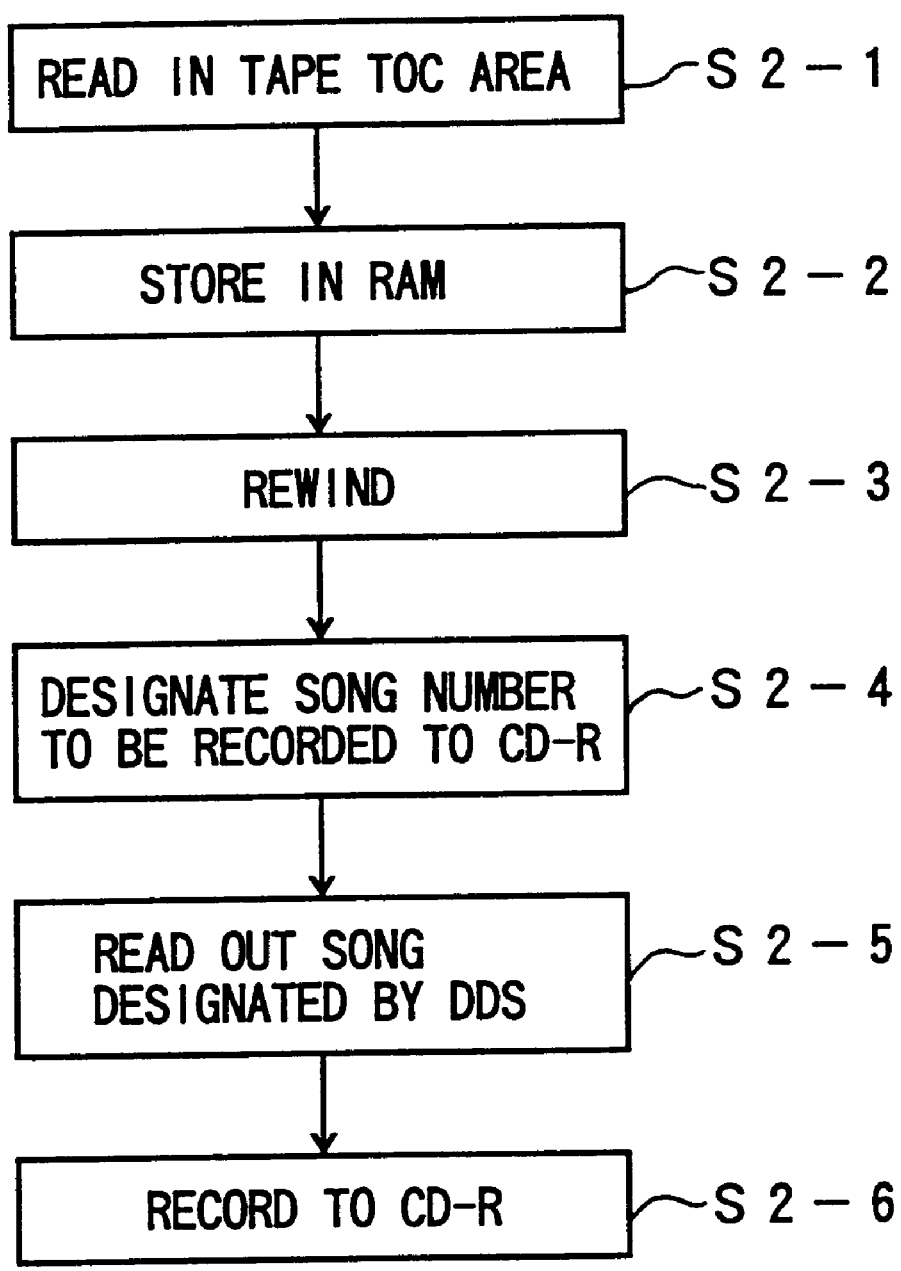
FIG. 7 is a flow chart of an editing operation of an information recording/reproducing apparatus according to an embodiment of the present invention.

Next, by an editing operation of the music information sequentially recorded onto the DAT tape 15 loaded in the DDS 27, the music information is recorded onto the CD-R disk 16 loaded in the CD-R drive 28 FIG. 7 is a flow chart of the editing operation of the information recording/reproducing apparatus according to the present embodiment.

When a command is issued from the song designator 25 to edit a desired music information from the music information recorded on the DAT tape 15 loaded in the DDS 27, the CPU 26 operates switches 29, 30 so that switch 29 disconnects the DSB transceiver 11 from the DDS 27 and switch 30 connects the output unit 13 to switch 31.

Additionally, the CPU 26 directs the DDS 27 to read out the TOC recorded at the start of the DAT tape 15 in a step S2-1 and store the TOC to the RAM 23 in a step S2-2.

When the TOC is read out and stored in the RAM 23 from the DAT tape 15 of the DDS 27 in step S2-2, the DAT tape 15 is then rewound to the starting position in a step S2-3.

The song number stored in the RAM 23 ???. When the song designator 25 is operated and a desired song selected in a step S2-4, the CPU 26 checks the RAM 23 table TB, acquires the start address An of the song selected by the song designator 25 and reproduces the music information recorded at the start address An designated from the DDS 27 in a step S2-5. At this time, in a step S2-6, the CPU 26 enables the CD-R drive 28 to write music information to the CD-R disk 16 and the CD-R drive 28 records the music information reproduced from the DDS 27 onto the CD-R disk 16. At this time, the CD-R drive 28 converts the reproduction music information supplied from the DDS 27 to CD-R format for recording to the CD-R disk 16.

As described above, just the desired music information from among DSB transmission music information recorded sequentially on the DAT tape 15 of the DDS 27 can be recorded to a CD-R disk 16.

When reading out the music information from the CD-R disk 16 loaded in the CD-R drive 28, the CPU 26 operates switch 29 so that the DSB transceiver 11 and the DDS 27 are disconnected from each other and, at the same time, the CPU 26 also operates switch 30 so as to connect the output unit 13 and switch 31 to each other and further operates switch 31 so as to connect the CD-R drive 28 and switch 30.

Figure 8:
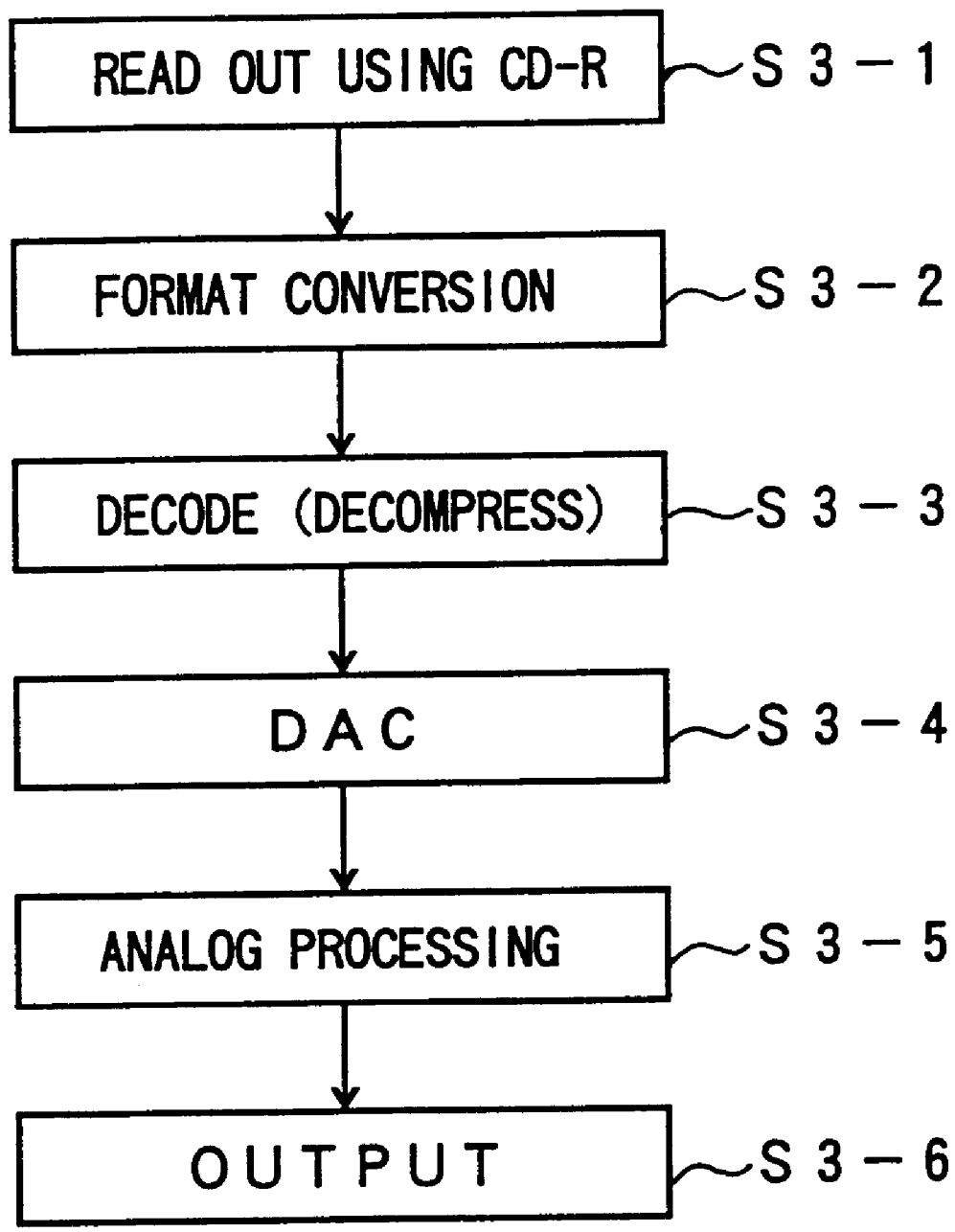
FIG. 8 is a diagram for the purpose of describing how the information recording/reproducing apparatus according to the present embodiment reproduces recorded information.

FIG. 8 is a diagram for the purpose of describing how the information recording/reproducing apparatus according to the present embodiment reproduces recorded information.

When music information is read from the CD-R disk 16 in a step S3-1, the CD-R drive 28 converts the information from the CD-R format to a format capable of ordinary reproduction in a step S3-2.

The data format-converted in step S3-2 is supplied to the decoder 32 via switches 31, 30. In a step S3-3 the decoder 32 decompresses the music information supplied from the CD-R drive 28.

The music information decompressed in step S3-3 is supplied to the DAC 33. In a step S3-4, the DAC 33 converts the music information decompressed in step S3-3 into an analog signal. It should be noted that if the DSB transmission is MP3, that is, compressed using MPEG audio layer 3, then the same is recorded in a compressed state to the DAT tape 15 and the CD-R disk 16 by the DDS 27 and CD-R drive 28, and is decompressed during reproduction by the decoder 32. In so doing it is possible to minimize on recording medium capacity.

The music information converted into an analog signal in step S3-4 described above is then supplied to an analog processing circuit 34. The analog processing circuit 34 performs a variety of analog processes on the analog signal supplied from the DAC 33 and reproduces and outputs an audio signal in a step S3-5, S3-6.

As described above, the music information edited to and recorded on the CD-R disk 16 can be reproduced. Only a desired song from among the songs of the continuously recorded DSB transmission is recorded, so subscribers can listen to the songs they like by replaying the CD-R disk 16.

It should be noted that although in the present embodiment the compressed DSB signal is recorded to the DAT tape 15 and the CD-R disk 16 by the DDS 27 and the CD-R drive 28, the signal may also be decompressed and recorded. Additionally, the signal may be compressed and recorded to the DAT tape 15 and may be decompressed and recorded to the CD disk 16. In this case, when replaying the CD-R disk 16 there is no need for a decoder 32.

Additionally, although the present embodiment uses a DDS 27 and a CD-R drive 28 as data storage means the invention is not limited to such means, and other data storage devices may be used. It should be noted that whatever device is used in place of the DDS 27 should be a large-capacity device, because DSB requires recording over a long period of time. Additionally, other optical disk recording/reproducing apparatuses, such as a CD-RW drive, a DVD-R/RW drive and the like can be used as a recording/reproducing apparatus in place of the CD-R drive 28 described above.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the present invention.

The present application is based on Japanese Priority Application No. 11-081773, filed on Mar. 25, 1999, the entire contents of which are hereby incorporated by reference.

What is claimed is:

1. An information recording and/or reproducing apparatus that records desired information from a plurality of kinds of information having identification information attached thereto, the apparatus comprising:

identification information detecting means for detecting the identification information from information supplied thereto;

first recording means for sequentially recording supplied information and for recording a table of contents (TOC) of the supplied information including the identification information detected by the identification information detecting means;

specifying means for specifying desired information from the TOC recorded by the first recording means; and controlling means for reading the desired information specified by the specifying means from the first recording means.

2. The information recording and/or reproducing apparatus as claimed in claim 1, further comprising second recording means for recording the information read from the first recording means by the controlling means.

3. The information recording/reproducing apparatus as claimed in claim 2, wherein the storage capacity of the first recording means is greater than the storage capacity of the second recording means.

4. The information recording/reproducing apparatus as claimed in claim 2, further comprising information expanding means for expanding information read from the second recording means.

5. The information recording apparatus as claimed in claim 1, wherein the first recording means includes a digital magnetic recording/reproducing apparatus.

6. The information recording apparatus as claimed in claim 2, wherein the second recording means includes an optical disk recording/reproducing apparatus.

7. The information recording/reproducing apparatus as claimed in claim 1, wherein the information is audio data, and the identifying information includes a title of the audio data.

* * * * *